(12) United States Patent
Quan et al.

(10) Patent No.: US 8,513,458 B2
(45) Date of Patent: Aug. 20, 2013

(54) PROCESS FOR PRODUCTION OF CARBONYL FLUORIDE

(75) Inventors: Heng-dao Quan, Ibaraki (JP); Masanori Tamura, Ibaraki (JP); Akira Sekiya, Ibaraki (JP)

(73) Assignee: Nat'l Institute of Advanced Industrial Science and Technology, Tokyo (JP)

( * ) Notice: Subject to any disclaimer, the term of this patent is extended or adjusted under 35 U.S.C. 154(b) by 877 days.

(21) Appl. No.: 12/067,243

(22) PCT Filed: Sep. 26, 2006

(86) PCT No.: PCT/JP2006/319652
§ 371 (c)(1),
(2), (4) Date: Apr. 8, 2010

(87) PCT Pub. No.: WO2007/037468
PCT Pub. Date: Apr. 5, 2007

(65) Prior Publication Data
US 2010/0191013 A1  Jul. 29, 2010

(30) Foreign Application Priority Data

Sep. 27, 2005  (JP) .................................. 2005-279178
Sep. 27, 2005  (JP) .................................. 2005-279196

(51) Int. Cl.
*C07C 51/58* (2006.01)
(52) U.S. Cl.
USPC ........................................................ 562/851
(58) Field of Classification Search
CPC ........................................................ C07C 51/58
See application file for complete search history.

(56) References Cited

U.S. PATENT DOCUMENTS 3,404,180 A     10/1968  Cordes
3,622,635 A  *  11/1971  Gozzo et al. ................. 568/601
3,639,429 A  *   2/1972  Weinmayr ................... 549/532
5,120,866 A  *   6/1992  Castellan et al. ............. 549/523
7,332,628 B2     2/2008  Mitsui et al.
2006/0194985 A1  8/2006  Mitsui et al.

FOREIGN PATENT DOCUMENTS

JP   2003-267712 A    9/2003
JP   2004-277215 A   10/2004

OTHER PUBLICATIONS

Park, J. et al. "Synthesis of tetrafluoroethylene," Ind. Eng. Chem., (1947) 39: 354-358.*
Orloff et al., An experimental study of the afterburning region of lean tetrafluoroethylene-oxygen flames, Combustion and Flame, 1976, vol. 26, pp. 141-150.*
Gozzo et al., The thermal decomposition of chlorodifluoromethane, Tetrahedron, 1966, vol. 22, No. 10, pp. 3329-3336.*
David I. Orloff et al.; An experimental study of the afterburning region of lean tetrafluoroethylene-oxygen flames, Combustion and Flame, 1976, vol. 26, pp. 141-150, Experimental.
F. Gozzo et al.; The thermal decomposition of chlorodifluoromethane, Tetrahedron, 1966, vol. 22, No. 10, pp. 3329-3336, Experimental.

* cited by examiner

*Primary Examiner* — Paul A Zucker
(74) *Attorney, Agent, or Firm* — Westerman, Hattori, Daniels & Adrian, LLP

(57) ABSTRACT

The present invention provides a method for inexpensively, efficiently, safely, and continuously producing $COF_2$, without using highly toxic raw materials such as phosgene or difficult-to-get raw materials, with no risk of explosion or the like. Tetrafluoroethylene gas and oxygen gas are introduced into a reactor, and they are then heated in a gas phase in the absence of nitrogen gas for reaction, so as to produce carbonyl fluoride. The reactor is preferably a tubular reaction tube. As such tetrafluoroethylene gas, unpurified or purified tetrafluoroethylene gas obtained by heating HCFC-22 gas for thermal decomposition can be used. According to the present invention, $COF_2$ that is useful as cleaning gas for CVD devices (chemical vapor deposition method) can be inexpensively, efficiently, and safely produced.

11 Claims, No Drawings

PROCESS FOR PRODUCTION OF CARBONYL FLUORIDE

TECHNICAL FIELD

The present invention relates to a method for producing carbonyl fluoride ($COF_2$) using tetrafluoroethylene (TFE) as a raw material, and more specifically to a method for producing $COF_2$, which is characterized in that it comprises allowing tetrafluoroethylene (TFE) to react with oxygen gas for oxidation.

Moreover, the present invention also relates to a method for producing carbonyl fluoride ($COF_2$) using chlorodifluoromethane (HCFC-22) as a raw material, and more specifically to a method for producing $COF_2$, which comprises producing tetrafluoroethylene (TFE) by thermal decomposition using HCFC-22 as a starting material, and then allowing the aforementioned TFE used as a raw material to react with oxygen gas for oxidation, so as to continuously produce $COF_2$ as a final compound of interest.

BACKGROUND ART

Perfluorocarbon (PFC), nitrogen trifluoride ($NF_3$), and the like have been used as cleaning gas in CVD devices (chemical vapor deposition method) used in a semiconductor production process or a liquid crystal production process, and in particular, in main processes of formation of oxide films or insulator films. The aforementioned two types of gases have an ozone depletion potential (ODP) that is zero. However, such gases have a global warming potential (GWP) for 100 years that is approximately 10,000 times greater than that of $CO_2$ (carbon dioxide). Thus, it has been desired that some type of alternative technique or alternative material be developed.

It is to be noted that such an ozone depletion potential (ODP) indicates the ability of each substance to destroy ozone, which is integrated with an infinite time, based on the present findings. The ODP is represented by a coefficient (relative value) obtained when chlorotrifluoromethane is defined as 1.

In addition, such a global warming potential (GWP) indicates the influence of each substance upon global warming, which is integrated with a certain period of time (100 years) per unit mass. The GWP is represented by a coefficient (relative value) obtained when carbon dioxide is defined as 1.

In order to develop an alternative technique or material that is substitutable for CVD chamber cleaning gas such as PFC or $NF_3$, a national project has advanced, and carbonyl fluoride ($COF_2$) has been selected as a dominant alternative material (refer to Non-Patent Document 1).

Carbonyl fluoride ($COF_2$) is nonflammable gas having a molecular weight of 66 and a boiling point of $-83°$ C. This gas has excellent cleaning properties, and it has the same level of cleaning effect when compared with conventional products. In addition, if such carbonyl fluoride coexists with water, it is decomposed to $CO_2$ (carbon dioxide). Since $COF_2$ is easily decomposed in the ambient air, a GWP value of 100 years is extremely small. Even an indirect GWP value of 100 years, which involves $CO_2$ generated as a result of decomposition, is 0.7 or less. Accordingly, when compared with PFC or $NF_3$, whose GWP value is considered to be 10,000 times greater than that of $CO_2$ (carbon dioxide), carbonyl fluoride is overwhelmingly advantageous. In the aforementioned project, it has been reported that $COF_2$ has the effect of significantly reducing a greenhouse effect, when compared with the aforementioned cleaning gases (refer to Non-Patent Document 2, for example).

Moreover, in the liquid crystal industry, practical application of $COF_2$ has already been reported. Since $COF_2$ is easily eliminated by a water scrubber, devices for eliminating $NF_3$ or PFC, which have been conventionally required, are not required. Thus, it is considered that practical application of $COF_2$ contributes to a reduction in energy consumption in production processes (refer to Non-Patent Document 3, for example).

In general, methods for synthesizing such $COF_2$ are broadly divided into four known methods: a method of allowing carbon monoxide or carbon dioxide to react with a suitable fluorinating agent such as fluorine or silver difluoride for oxidation; a method of allowing carbonyl dichloride, namely, phosgene to react with a suitable fluorinating agent such as hydrogen fluoride, antimonyl trifluoride, arsenic trifluoride, or sodium fluoride, so as to carry out halogen exchange from chlorine atoms in molecules to the corresponding fluorine atoms; a method of allowing trifluoromethane to react with oxygen; and a method of allowing tetrafluoroethylene gas to react with oxygen.

Specific examples of these methods will be described below.

1. Methods Using Carbon Monoxide or Carbon Dioxide as Raw Material;

The following methods have been known as methods using carbon monoxide or carbon dioxide as a raw material, for example:

(a) a method of directly fluorinating carbonic acid gas and fluorine gas in a gas phase (refer to Patent Document 1);

(b) a method involving electrolytic fluorination of carbon monoxide (refer to Patent Document 2);

(c) a method comprising adding at least one type of third component gas selected from among $N_2$, He, Ne and Ar, when carbonyl fluoride is continuously produced by the reaction of carbon monoxide with fluorine gas, then carrying out the reaction while supplying the gas in a dynamic state and under a reduced pressure, and then circulating the third component gas or the third component gas containing unreacted carbon monoxide after the carbon fluoride has been captured with a cold trap (refer to Patent Document 3);

(d) a method of allowing a fluorine-containing compound such as a metal fluoride that is in a state excited by plasma to react with CO, so as to obtain a gaseous reaction mixture, and then quenching the gaseous reaction mixture to obtain $COF_2$, thereby producing carbonyl fluoride (refer to Patent Document 4); and (e) a method of directly fluorinating carbon monoxide with fluorine gas (refer to Non-Patent Document 4, for example).

However, such methods involving electrolytic fluorination or direct fluorination of carbon monoxide are not industrially adequate because they require an expensive electrolytic cell or a corrosive-resistant material, or because large equipment is required for regulating a large amount of heat of reaction. In addition, in a method of synthesizing $COF_2$ by a direct reaction between carbon monoxide and fluorine, since it is a reaction between carbon monoxide that is inflammable gas and fluorine that is strongly oxidizer gas, such a reaction may explosively occur or impurities such as carbon tetrafluoride may be generated due to the heat of reaction, thereby resulting in a decrease in purity.

2. Methods Using Phosgene as Raw Material;

The following methods have been known as methods using phosgene as a raw material, for example:

(a) a method of blowing phosgene into a hydrogen fluoride aqueous solution to which triethylamine has been added, or a hydrogen fluoride aqueous solution into which an alkali metal fluoride has been dispersed (refer to Patent Document 5);
(b) a method of fluorinating phosgene with sodium fluoride in a solvent (refer to Patent Document 6);
(c) a method of fluorinating phosgene with hydrogen fluoride via an activated carbon catalyst in a gas phase (refer to Patent Document 7); and
(d) a method comprising allowing phosgene to come into contact with an inorganic fluoride in a gas phase, then allowing the resultant to come into contact with activated carbon in a gas phase to obtain phosgene and difluorocarbonyl chloride, and allowing them to come into contact with activated carbon in a gas phase, so as to obtain carbonyl fluoride (refer to Patent Document 8).

In such reactions using phosgene, however, it is necessary to use highly toxic phosgene as a raw material. Further, the synthesized $COF_2$ contains impurities such as carbonyl chloride fluoride derived from chlorine or a fluorinating agent. Furthermore, it is difficult to separate such $COF_2$ from carbon dioxide derived from water. Thus, the aforementioned methods have not necessarily been satisfactory.

For example, method (a), which involves fluorination with hydrogen fluoride in the presence of a solvent, is disadvantageous in terms of difficulty in separation of $COF_2$ from the generated hydrogen chloride. In the aforementioned method, which involves fluorination of phosgene with hydrogen fluoride in the presence of a solvent and triethylamine or fluorination of phosgene with sodium fluoride in the presence of a solvent, carbonyl fluoride can be obtained without generation of hydrogen chloride. However, since hydrochloride of triethylamine or sodium chloride is generated in an equimolar amount of the generated carbonyl fluoride, the disposal or recycling thereof becomes necessary.

In method (c) involving fluorination of phosgene with hydrogen fluoride via an activated carbon catalyst, carbonyl fluoride is mainly generated under the aforementioned conditions, and it becomes difficult to eliminate hydrogen chloride generated as a by-product.

In method (d), which comprises fluorinating phosgene with an inorganic fluoride in a gas phase to obtain a mixture containing difluorocarbonyl chloride, allowing the mixture to come into contact with activated carbon to convert it to a mixture of difluorocarbonyl chloride and phosgene, and disproportionating the difluorocarbonyl chloride with an activated carbon catalyst, so as to obtain carbonyl fluoride, carbon monoxide and chlorine are generated as by-products during the fluorination of phosgene with an organic fluoride. In order to convert such by-products to phosgene, it is necessary to allow them to come into contact with activated carbon. Thus, extra equipment is required.

3. Method Using Trifluoromethane as Raw Material;

As a method using trifluoromethane as a raw material, a method of allowing trifluoromethane to react with oxygen under heating has been known, for example (refer to Patent Document 13).

However, in order to favorably produce carbonyl fluoride by this method, a high reaction temperature of 500° C. or higher is necessary. In addition, there are many cases where carbon dioxide is contained as a by-product in the reaction product. It is difficult to eliminate such carbon dioxide from carbonyl fluoride.

4. Methods Using Tetrafluoroethylene as Raw Material;

The following methods have been known as methods using tetrafluoroethylene as a raw material, for example:

(a) a method of allowing ethane fluoride to react with ozone (refer to Non-Patent Document 5, for example);
(b) a method of allowing tetrafluoroethylene (TFE) to react with oxygen containing oxygen difluoride to obtain carbonyl fluoride (refer to Patent Document 9); and
(c) a method of oxidizing tetrafluoroethylene (TFE) with oxygen in an equimolar amount of TFE in coexistence with a large amount of diluent comprising a fluorine compound, so as to obtain $COF_2$ (refer to Patent Documents 10 and 11, for example).

However, in the reaction of ethane fluoride with ozone described in (a) above or in the static reaction of carbon monoxide with carbon tetrafluoride, both the yield and purity of the product are low, and thus it is difficult to use such methods as industrial processes.

In method (b), generation of carbonic acid gas has not been confirmed. However, since carbonyl fluoride is easily hydrolyzed by water contained in a raw material or a catalyst to generate carbonic acid gas and hydrogen fluoride, there is also a possibility that carbonic acid gas is generated after completion of the reaction. In particular, the amount of carbonic acid gas generated as a by-product or mixed into the reaction product as an unreacted raw material makes up several percent to several tens of percent of the amount of the reaction product. For the intended use of $COF_2$ as cleaning gas in production of semiconductors, reduction in the amount of such carbonic acid gas or separation of such carbonic acid gas is required. In addition, since oxygen difluoride used as a raw material is an explosive substance, there is a high risk in operating it.

Moreover, it is necessary for method (c) to carry out the reaction in a flow system using TFE and oxygen in an equimolar amount of the TFE at a temperature between 200° C. and 450° C. for a reaction time between 1 and 10 seconds, also using, as a diluent, carbonyl fluoride, Freon-22, Freon-113, Freon C51-12, or FC-75 comprising a mixture of perfluoro cyclic ethers, at a molar ratio between 10:1 and 100:1 with respect to the oxygen. This publication has reported that a large amount of heat of reaction is generated in the reaction of TFE with oxygen, and that if a mixture obtained by mixing TFE with oxygen in an equimolar amount of the TFE is generally heated, it is exploded, and thereby only a small amount of $COF_2$ is obtained. Thus, a diluent is used to suppress such explosion according to the aforementioned publication. However, a fluorine compound used as such a diluent is not necessarily inexpensive, and further, such a diluent has also been problematic in terms of an operation to separate the diluent from the product.

Furthermore, TFE used as a raw material in production of $COF_2$ is produced by applying a high-temperature thermal decomposition method to monochlorodifluoromethane in the industrial field. Originally, such a thermal decomposition reaction is a complicated reaction attended with decomposition of molecules and the recombination thereof. Thus, many types of by-products are generated in this reaction. Accordingly, it is an important object to efficiently separate and purify a high-purity TFE of interest from a product generated as a result of the thermal decomposition, which comprises many types of by-products, and to efficiently reuse unreacted R-22 (refer to Patent Document 12).

5. Method for Producing TFE Used as Raw Material in Production of $COF_2$;

Tetrafluoroethylene (TFE) can be produced by applying a high-temperature thermal decomposition method to chlorodifluoromethane HCFC-22 (which is also referred to as "R-22" at times) in the industrial field.

As a thermal decomposition temperature applied in the thermal decomposition reaction of HCFC-22, any temperature may be applied, as long as it is a temperature at which HCFC-22 can be decomposed. In order to enhance the yield of TFE, the reaction is generally carried out in an atmosphere at a temperature between 600° C. and 700° C. There are two thermal decomposition methods, namely, an external thermal decomposition method and an internal thermal decomposition method. The internal thermal decomposition method is a method of allowing HCFC-22 to come into contact with heated water vapor for heating the HCFC-22. This method is adopted in many field sites. On the other hand, the external thermal decomposition method is a method comprising supplying HCFC-22 to a thermal decomposition reaction device and then providing heat thereto from outside of the reaction device by a method such as use of a heating medium or direct heating.

By the way, since such a thermal decomposition reaction is a complicated reaction attended with decomposition of molecules and the recombination thereof, many reaction by-products are generated as a result of this reaction. Accordingly, it has been an important object to efficiently separate and purify high-purity TFE of interest from thermally decomposed products containing such reaction by-products, or to efficiently reuse unreacted HCFC-22.

For the aforementioned object, TFE has been purified by a method comprising: cooling, deoxidizing and drying the product obtained by thermal decomposition of HCFC-22; supplying the resultant to a first rectification device for rectification; discharging the total quantities of components such as carbon monoxide or trifluoromethane whose boiling point is lower than that of TFE from the top of the first rectification device, and at the same time, eliminating components including TFE other than the aforementioned components, which have a high boiling point, from the bottom of the aforementioned device; and then supplying such components having a high boiling point to a second rectification device, so as to distill the TFE of interest from the top thereof and eliminate components having a higher boiling point than that of the TFE from the bottom thereof.

At that time, the components eliminated from the bottom of the second rectification device comprise many components having a higher boiling point than that of TFE, as well as HCFC-22 used as a raw material. Thus, the components eliminated from the aforementioned bottom have been purified to separate HCFC-22, and thereafter, R-22, which had been consumed by thermal decomposition, has been replenished and has been then supplied to the thermal decomposition process again.

[Patent Document 1] Japanese Patent Laid-Open No. 11-116216
[Patent Document 2] Japanese Patent Publication No. 45-26611
[Patent Document 3] Japanese Patent Laid-Open No. 2003-267712
[Patent Document 4] National Publication of International Patent Application No. 2002-515011
[Patent Document 5] Japanese Patent Laid-Open No. 54-158396
[Patent Document 6] U.S. Pat. No. 3,088,975
[Patent Document 7] U.S. Pat. No. 2,836,622
[Patent Document 8] E.P. Patent No. 0253527
[Patent Document 9] U.S. Pat. No. 3,639,429
[Patent Document 10] U.S. Pat. No. 3,404,180
[Patent Document 11] USSR Inventor's Certificate No. 424809 (1974) and RU (11) 2167812
[Patent Document 12] Japanese Patent Laid-Open No. 7-233104
[Patent Document 13] International Publication WO2005/105668
[Non-Patent Document 1] "Evaluation of $COF_2$ in Mass Production Line," Masaji Sakamura, and "Alternate Gas for CVD Cleaning," Yuki Misui, 12th Annual ISESH Conference (Portland) Jul. 19-23, 2005
[Non-Patent Document 2] Internet <URL: http://www.rite.or.jp/Japanese/kicho/kikaku/world/world04/01-18_19.pdf> Semiconductor CVD Cleaning Project Report [searched in Aug. 16, 2005], Technical Information Magazine "RITE WORLD" No. 1 (first issue) Study Group News, Planning Section, Planning and Research Group, the Research Institute of Innovative Technology for the Earth (RITE)
[Non-Patent Document 3] "$COF_2$ used as cleaning gas in production of liquid crystal," Nikkei Sangyo Shimbun, Jun. 30, 2005
[Non-Patent Document 4] J. Amer. Chem. Soc., 91, 4432 (1969)
[Non-Patent Document 5] J. Amer. Chem. Soc., 102, 7572 (1980)

As stated above, methods for producing carbonyl fluoride ($COF_2$) are broadly divided into 4 methods. One of the 4 methods, namely, a method using tetrafluoroethylene (TFE) as a raw material described in the aforementioned Patent Document 10 has required addition of an expensive gaseous fluorine compound (diluent) in an amount 10 to 100 times larger than oxygen, in order to avoid explosion.

It has been known that such TFE used as a raw material is produced from HCFC-22. However, since this production method involves thermal decomposition, various types of by-products comprising a fluorine compound as a main body, such as trifluoromethane, are generated. Thus, in order to purify the reaction product, and also in order to recover unreacted HCFC-22, enormous manpower, cost, and equipment have been required.

DISCLOSURE OF INVENTION

Accordingly, it is an object of the present invention to provide a method for inexpensively, efficiently, safely and continuously producing $COF_2$ at a good yield, using TEF as a raw material, without using highly toxic raw materials such as phosgene or difficult-to-get auxiliary materials, and in particular, without using various types of fluorine compounds as diluents, and further without dangers such as explosion.

In addition, it is another object of the present invention to provide a method for inexpensively, efficiently, safely and continuously producing $COF_2$ without dangers such as explosion, which comprises: thermally decomposing HCFC-22 used as a raw material, so as to produce TFE; and directly using the TFE as a raw material without purification.

Previously, there has been a possibility of explosion, when TFE has been allowed to directly react with oxygen. In order to prevent such explosion, a diluent (a gaseous fluorine compound) has been used in an amount 10 times larger than oxygen gas.

However, the present inventors have found that fluorine compounds that have been conventionally used as diluents are restrictive. That is to say, the inventors have found that when purified high-purity TFE is used, or when unpurified TFE produced from HCFC-22 is used, it is not always necessary to use a large amount of diluent for prevention of explosion, and further that the presence of nitrogen gas inhibits progression of the oxidation reaction of TFE.

The present inventors have focused on a fluorine compound in production of COF$_2$ and in the production process of TFE. The inventors have discovered that a fluorine compound generated as a by-product in production of TFE from HCFC-22 does not affect at all reactions in a method for producing COF$_2$, in which TFE used as a raw material is oxidized by oxygen gas, and thus that there are no needs for eliminating, that is, purifying such a fluorine compound. Moreover, the inventors have also discovered that when COF$_2$ is produced by oxidation of TFE, the yield of COF$_2$ is improved by eliminating coexisting nitrogen gas to the maximum extent as possible. Furthermore, the inventors have also discovered that when carbonyl fluoride (COF$_2$) is produced, if reaction methods or reaction conditions are appropriately determined, for example, if the heat of reaction is efficiently diffused, COF$_2$ can be efficiently produced using no diluents or only a small amount of diluent without danger of explosion, thereby completing the present invention.

According to the present invention, TFE itself, or unpurified TFE obtained by thermal decomposition of chlorodifluoromethane (HCFC-22), is allowed to react with oxygen gas directly, so as to produce carbonyl fluoride (COF$_2$) of interest.

Specifically, the present invention is as follows:

1. A method for producing carbonyl fluoride, which is characterized in that it comprises: introducing tetrafluoroethylene gas selected from a tetrafluoroethylene gas mixture of purified tetrafluoroethylene gas, an unpurified tetrafluoroethylene gas composition comprising a reaction by-product generated during production of tetrafluoroethylene, and a diluent comprising a fluorine compound contained as a third component, wherein the content of tetrafluoroethylene in the tetrafluoroethylene gas is greater than the contents of other components at a molar ratio of more than 1/10, into a reactor, together with oxygen gas in a molar amount of 0.9 to 5 times the molar amount of the above described tetrafluoroethylene; and then heating the obtained mixture for reaction.

2. The method for producing carbonyl fluoride according to 1 above, wherein the oxygen is used in a molar amount of 0.9 to 3.5 times the molar amount of the tetrafluoroethylene.

3. The method for producing carbonyl fluoride according to 1 or 2 above, wherein nitrogen gas is contained in the reactor in a molar amount of 3 times or less the molar amount of the oxygen gas.

4. The method for producing carbonyl fluoride according to any one of 1 to 3 above, which is characterized in that the reactor is filled with a filler used as a catalyst or a heating medium selected from the group consisting of a metal fluoride, a metal oxide, and a metal.

5. The method for producing carbonyl fluoride according to any one of 1 to 4 above, which is characterized in that the reactor used for the reaction of the tetrafluoroethylene gas with the oxygen gas is a corrosive-resistant hermetically sealed reactor, which has a volume of 30 L to 40 L with respect to 1 mole of oxygen gas.

6. The method for producing carbonyl fluoride according to any one of 1 to 4 above, wherein the reactor used for the reaction of the tetrafluoroethylene gas with the oxygen gas is a reaction tube for oxidation reaction.

7. The method for producing carbonyl fluoride according to 6 above, which is characterized in that the reaction tube for oxidation reaction is a corrosive-resistant reaction tube having a diameter between 0.3 mm and 30 mm and a length between 0.1 m and 30 m.

8. The method for producing carbonyl fluoride according to 6 or 7 above, wherein the retention time of the tetrafluoroethylene gas in the reaction tube is 1 to 30 seconds.

9. The method for producing carbonyl fluoride according to any one of 1 to 8 above, wherein the heat reaction temperature is between 300° C. and 450° C. in a gas phase.

10. The method for producing carbonyl fluoride according to 1 above, wherein the tetrafluoroethylene gas to be introduced into the reactor is a purified highly-concentrated tetrafluoroethylene gas or a tetrafluoroethylene gas mixture of the above described purified highly-concentrated tetrafluoroethylene gas and a diluent, wherein the content of tetrafluoroethylene in the above described highly-concentrated tetrafluoroethylene gas or the above described tetrafluoroethylene gas mixture is greater than the contents of other components at a molar ratio of more than 1/10.

11. The method for producing carbonyl fluoride according to 1 above, wherein the tetrafluoroethylene gas to be introduced into the reactor is an unpurified tetrafluoroethylene gas composition or a tetrafluoroethylene gas mixture of the above described unpurified tetrafluoroethylene gas composition and a diluent obtained by the thermal decomposition reaction of HCFC-22, wherein the content of tetrafluoroethylene in the above described unpurified tetrafluoroethylene gas composition or the above described tetrafluoroethylene gas mixture is greater than the contents of other components at a molar ratio of more than 1/10.

12. A method for producing carbonyl fluoride, which is characterized in that it comprises: obtaining a tetrafluoroethylene gas composition by thermally decomposing chlorodifluoromethane gas and then eliminating hydrochloric acid from the reaction product, followed by drying; then introducing the thus obtained tetrafluoroethylene gas composition into a reactor, together with oxygen gas in the absence of a diluent, without purifying the tetrafluoroethylene gas composition; and then heating them in a gas phase for reaction.

13. The method for producing carbonyl fluoride according to 12 above, which is characterized in that it comprises adding water vapor heated up to a temperature between 750° C. and 950° C. to chlorodifluoromethane in an amount 5 to 15 times the amount of the chlorodifluoromethane, so as to cause the chlorodifluoromethane gas to flow into a pyrolysis reaction tube, thereby thermally decomposing HCFC-22 gas.

14. The method for producing carbonyl fluoride according to 13 above, wherein the pyrolysis reaction tube has a diameter between 0.3 mm and 10 mm and a length between 200 mm and 600 mm.

15. The method for producing carbonyl fluoride according to 14 above, wherein the retention time of the chlorodifluoromethane gas in the pyrolysis reaction tube is 0.001 to 0.1 second.

16. The method for producing carbonyl fluoride according to any one of 12 to 15 above, wherein the oxygen is used in a molar amount of 0.9 to 3.5 times the molar amount of the tetrafluoroethylene.

17. The method for producing carbonyl fluoride according to any one of 12 to 16 above, wherein nitrogen gas is contained in the reactor in a molar amount of 3 times or less the molar amount of the oxygen gas.

18. The method for producing carbonyl fluoride according to any one of 12 to 17 above, wherein the reactor used for the reaction of the tetrafluoroethylene composition and the oxygen gas is a reaction tube for oxidation reaction.

19. The method for producing carbonyl fluoride according to 18 above, which is characterized in that the reaction tube for oxidation reaction has a diameter between 0.3 mm and 30 mm and a length between 0.1 m and 30 m.

20. The method for producing carbonyl fluoride according to 18 or 19 above, wherein the retention time of the tetrafluoroethylene in the reaction tube for oxidation reaction is 1 to 30 seconds.

21. An unpurified tetrafluoroethylene gas composition used in production of carbonyl fluoride, which is obtained by heating chlorodifluoromethane introduced into a reactor for thermal decomposition, eliminating hydrochloric acid from the generated tetrafluoroethylene gas, and further drying the resultant.

According to the present invention, differing from the prior art technique, it is not necessary to use a large amount of diluent, such as a diluent in a molar amount of 10 times or more the molar amount of oxygen, and further, purified expensive TFE is not necessarily used. TFE itself, or a purified or unpurified TFE gas composition obtained by thermal decomposition of chlorodifluoromethane (HCFC-22), is allowed to simply react with oxygen gas, so as to continuously produce carbonyl fluoride ($COF_2$) of interest. Accordingly, it becomes unnecessary to purify TFE or to use an expensive diluent, and further, the carbonyl fluoride ($COF_2$) of interest can be safely, efficiently, inexpensively, and continuously produced with no risk of explosion and the like.

Moreover, it has been previously considered that a TFE composition produced from HCFC-22 by a high-temperature thermal decomposition method has no commercial value unless it is purified. However, it is not particularly necessary to purify the TFE composition when it is used in the present invention. Thus, the TFE composition can be directly used as a raw material for production of $COF_2$. Accordingly, an unpurified TFE composition will be used for a new intended use, and the value thereof will be significantly enhanced.

DETAILED DESCRIPTION OF THE INVENTION (1) Batch Method and Flow Method

The term "reaction" is used in the present specification to mean a reaction carried out by a batch method in a hermetically sealed vessel, or a reaction carried out by a flow method (continuous method) of conducting a reaction while supplying a raw material into a reaction tube. It is preferably a flow method (continuous method).

(2) Reactor

The term "reactor" is used to mean a "hermetically sealed reactor" used in the batch method, or a "reaction tube" such as a tubular reactor used in the flow method. Any form of tube may be used herein. The expression "introducing gas into a reactor" is used to mean that a hermetically sealed vessel is filled with gas, so as to carry out a reaction by the batch method, or that gas is supplied to a reaction tube, so as to carry out a reaction by the flow method. Preferred examples of materials for such vessels include corrosive-resistant stainless material, Monel alloy, Hastelloy alloy, and Inconel alloy.

In order to carry out the reaction under a low pressure so as to suppress an explosive reaction, the size of a "hermetically sealed reactor" used, and particularly, the size of a vessel used in the process of producing $COF_2$ from TFE, is preferably large enough for a raw material. For example, a vessel having a volume of 30 to 40 L is preferably used with respect to 1 mole of oxygen gas in a scale of several mmol, although it depends on a reaction scale or reaction conditions.

When such a "reaction tube" is used, the ratio of the diameter of the used reaction tube to the length thereof differs depending on a production scale, a reaction temperature, the flow rate of gas, etc. Herein, the reaction tube used in the thermal decomposition process of HCFC-22 is called a "pyrolysis reaction tube," and the reaction tube used in the process of producing $COF_2$ from TFE and oxygen is called a "reaction tube for oxidation reaction."

When $COF_2$ is produced from TFE, high-temperature heat of reaction is generated. Thus, as a reaction tube for oxidation reaction, a reaction tube having a high heat radiation efficiency is preferable. An example of such a reaction tube is a reaction tube whose length is sufficiently greater than the diameter (inside diameter) thereof. For example, a length of 0.1 m to 30 m is applied to a diameter of 0.3 mm and 30 mm, and more preferably, a length of 0.2 m to 15 m is applied to a diameter of 2 mm to 15 mm, although it depends on the flow rate of gas. It is preferable to supply TFE into such a reaction tube for oxidation reaction, such that the retention time of TFE in the aforementioned reaction tube becomes 1 to 30 seconds. (The term "retention time" is used herein to mean the time at which raw material gas remains in a reaction tube, and it is represented by the formula (the volume of the reaction tube/(0° C., the supplying rate of the raw material gas at 1 atmospheric pressure). The unit is second. The same is also applied below.)

Moreover, when TFE is produced from HCFC-22, a preferred diameter (inside diameter) of a pyrolysis reaction tube is 0.3 mm to 10 mm, and more preferably 2 mm to 10 mm, although it depends on the flow rate of HCFC-22. On the other hand, the length thereof is 200 mm to 600 mm. HCFC-22 is preferably supplied to such a pyrolysis reaction tube, such that the retention time of HCFC-22 in the pyrolysis reaction tube becomes 0.001 to 0.1 second.

Furthermore, the amount of water vapor used in the thermal decomposition reaction of HCFC-22 is preferably 5 to 15 times greater than the amount of HCFC.

The form of such a reaction tube for oxidation reaction or a pyrolysis reaction tube is not particularly limited, as long as it is able to efficiently diffuse the heat of reaction. For example, the aforementioned reaction tube having a length of several meters may be wound in a spiral fashion. Thus, the size of the reaction tube may be reduced for easy operations such as heating or good handlability, and it may be then used.

(3) Oxygen Gas

The term "oxygen gas" is used to mean pure oxygen gas or highly purified oxygen gas, namely, gas substantially consisting of oxygen. Such oxygen gas may be either commercially available oxygen gas product enclosed in a cylinder, or another type of oxygen gas, which is industrially available. The term "highly purified oxygen gas" is used to mean oxygen gas having a purity of preferably 95 mole % or more, and more preferably 99 mole % or more.

(4) Nitrogen Gas

Since the mixing of nitrogen gas impedes the present reaction, the amount of nitrogen gas mixed is preferably as small as possible. With regard to an acceptable amount of nitrogen gas, such nitrogen gas is used in a molar amount of preferably 3 times or less, more preferably 2 times or less, further more preferably 1 time or less, and most preferably 10 mole % or less, with respect to the molar amount of oxygen. Accordingly, the expression "in the absence of nitrogen gas" is used to mean that nitrogen gas in an amount necessary for inhibiting the reaction is not substantially contained, and thus, the aforementioned expression means a state wherein nitrogen gas is contained in a range of 10 mole % or less, preferably 5 mole % or less, and more preferably 0 mole %, with respect to oxygen.

In order to eliminate nitrogen gas that is mixed as air in a reactor, the aforementioned oxygen gas, or TFE or HCFC-22 as a reaction material, is supplied into the reactor, so as to substitute them for the nitrogen gas. Otherwise, elimination of nitrogen gas can easily be achieved by vacuuming the reactor and then filling it with oxygen gas, TFE, or HCFC-22.

(5) Oxygen Gas and TFE

With regard to the amount of oxygen gas, since the reaction of TFE with oxygen is an equimolar reaction, the mixing ratio of TFE and oxygen is optimally an equimolar ratio from the viewpoint of reaction efficiency and economical efficiency. However, even if oxygen is used in an amount more than equimolar to TFE, and for example, even if 5 moles of oxygen is used to TFE, such amount of oxygen does not inhibit the reaction. In addition, 0.9 moles of oxygen may also be used to 1 mole of TFE in some cases. Accordingly, as an acceptable molar amount of oxygen, such oxygen is used in a molar amount of 0.9 to 5 times, preferably 0.9 to 3.5 times, particularly preferably 0.9 to 1.5 times, and optimally in an amount equimolar to the TFE. The term "equimolar amount" is not necessarily used to mean a strictly equimolar amount, but to mean 0.9 to 1.2 moles.

The mixing ratio of oxygen to the purified TFE gas or an unpurified TFE gas composition may be determined, while considering the ratio of TFE contained in such a purified or unpurified TFE gas composition. Moreover, when a diluent is added under conditions wherein the content of TFE is greater than 1/10 at a molar ratio, the mixing ratio of oxygen to the purified or unpurified TFE gas composition may be determined, while considering the ratio of TFE contained in the diluent.

(6) Chlorodifluoromethane

"Chlorodifluoromethane" is a fluoride ($CHClF_2$), which is also called HCFC-22. A commercially available HCFC-22 product can be used. The purity thereof is not particularly limited. HCFC-22 having as high as possible purity is preferable. The purity is preferably 90% or more, and more preferably 98% or more.

(7) Heat Reaction and Thermal Decomposition Temperature

The heating temperature applied in a "heat reaction" differs depending on a reaction time, a reaction scale, etc. The heating temperature applied in a reaction of converting TFE to $COF_2$ is preferably between 300° C. and 450° C. In the case of using a batch-type reactor, the heating temperature is preferably between 350° C. and 450° C. In the case of applying the continuous method using a reaction tube, the heating temperature is preferably between 300° C. and 450° C.

Further, the thermal decomposition temperature applied when HCFC-22 is thermally decomposed to produce TFE used as a raw material in production of $COF_2$ is preferably between 700° C. and 950° C., and more preferably between 750° C. and 950° C., although it depends on the diameter of a pyrolysis reaction tube, the flow rate of HCFC-22 that flows in the reaction tube, the concentration of a diluent, and other conditions.

(8) Tetrafluoroethylene Gas

The term "tetrafluoroethylene gas (TFE gas)" is used to mean a TFE gas mixture, which comprises the below-mentioned purified TFE gas, an unpurified TFE gas composition containing reaction by-products generated during the production of TFE, and a diluent comprising a fluorine compound contained as a third component. However, it is necessary that the content of TFE in such TFE gas be greater than the contents of other types of gases comprising the reaction by-products generated during the production of TFE, diluents, etc., at a molar ratio of more than 1/10.

(9) Purified Tetrafluoroethylene Gas

The "purified tetrafluoroethylene gas" is a term corresponding to an unpurified TFE gas composition. This term is used to mean pure TFE gas, purified, high-purity and highly concentrated TFE gas, which is commercially available or is produced at an industrial level. Specifically, such purified tetrafluoroethylene gas has a TFE concentration of 90% or more, and more preferably 98% or more.

(10) Tetrafluoroethylene Gas Composition

The term "tetrafluoroethylene gas composition (TFE gas composition)" is used to mean an unpurified TFE gas composition, which is commercially available or is produced at an industrial level. Such a TFE gas composition is preferably a TFE gas composition obtained by a thermal decomposition reaction of HCFC-22 (HCFC-22-derived TFE composition). Such an "HCFC-22-derived TFE composition" is a gas composition, which comprises not only TFE as a main component, but also by-products generated as a result of thermal decomposition that consist of various types of fluorine compounds, and unreacted HCFC-22. However, it is necessary that the content of TFE be greater than the contents of other gas components comprising reaction by-products, unreacted raw materials, etc., at a molar ratio of more than 1/10 in the TFE gas composition. It is to be noted that a fluorine compound used as a diluent is not included in the scope of the tetrafluoroethylene gas composition.

In general, it is considered that the selective rate (conversion rate) of HCFC-22 to TFE is 70 to 95. Examples of the aforementioned by-products include fluorine compounds such as trifluoromethane, hexafluoropropylene, tetrafluorochloroethane or perfluorocyclobutane, and carbon monoxide.

(11) Tetrafluoroethylene Gas Mixture

The term "tetrafluoroethylene gas mixture (TFE gas mixture)" is used to mean a TFE gas mixture comprising a diluent comprising a fluorine compound contained as a third component. Specifically, this term means a mixture formed by mixing a diluent comprising a fluorine compound into the aforementioned "purified TFE gas" or an unpurified TFE gas composition comprising reaction by-products generated during the production of TFE. As in the case of the TFE gas composition, it is necessary that the content of TFE be greater than the contents of other gas components comprising reaction by-products generated during the production of TFE, diluents, etc. at a molar ratio of more than 1/10 in the TFE gas mixture.

(12) TFE Gas Comprising Tetrafluoroethylene Whose Content is Greater than Those of Other Components at Molar Ratio of More than 1/10

The term "TFE gas comprising TFE whose content is greater than those of other components at a molar ratio of more than 1/10" is used to mean the aforementioned "purified TFE gas," "unpurified TFE gas composition," or a "TFE gas mixture" of the aforementioned purified TFE gas or unpurified TFE gas composition and a diluent, wherein the content of TFE is greater than other gaseous components comprising reaction by-products generated during the production of TFE, diluents, etc., at a molar ratio of more than 1/10.

(13) Fluorine Compound

The term "fluorine compound" is used to mean a compound having a fluorine atom(s), which contains 1 to 10, preferably 1 to 4, and more preferably 1 or 2 carbon atoms. Examples of such a fluorine compound include fluorocarbon compounds such as $COF_2$, chlorofluorocarbons (CFCs), hydrochlorofluorocarbons (HCFCs), perfluorocarbons (PFCs), or hydrofluorocarbons (HFCs). Specific examples of such a fluorine compound are as follows.

Examples of CFCs include CFC-11 ($CCl_3F$), CFC-12 ($CCl_2F_2$), and CFC-113 ($CCl_2FCClF_2$). Of these, CFC-113 is particularly preferable. Examples of HCFCs include HCFC-22 ($CHClF_2$), HCFC-123 ($CHCl_2CF_3$), HCFC-141b ($CH_3CCl_2F$), and HCFC-142b ($CH_3CClF_2$). Of these, HCFC-22 is particularly preferable. An example of PFCs is $C_2F_6$. Examples of HFCs include HFC-23 ($CHF_3$), HFC-32 ($CH_2F_2$), HFC-125 ($CHF_2CF_3$), HFC134a ($CH_2FCF_3$), HFC-143a ($CH_3CF_3$), and HFC-152a ($CH_3CHF_2$).

Other than the aforementioned fluorine compounds, examples of a diluent that does not affect the reaction may include: CFC/HCFC mixed type diluents (e.g. R-502 (HCFC-22/CFC-115 azeotropic mixture)); and HFC mixtures (e.g. R-404A (HFC-125/143a/134a mixture), R407C(HFC-32/125/134a mixture), and R-410A (HFC-32/125 mixture)).

(14) Other Components

The term "other components" is used to mean by-products generated as a result of thermal decomposition and unreacted HCFC-22, which are contained in an HCFC-22-derived TFE gas composition, or a diluent contained in a TFE gas mixture.

(15) Diluent

The term "diluent" is used to mean a fluorine compound, which may be added to the purified TFE gas or an unpurified TFE gas composition when $COF_2$ is produced from TFE. It is to be noted that a fluorine compound generated as a by-product when $COF_2$ is continuously produced from HCFC-22 is inevitably mixed into a TFE product, but is not intentionally added. Thus, such a fluorine compound as a by-product is not included in the scope of a diluent herein. In the present invention, TFE gas may be allowed to react with oxygen gas under conditions wherein oxygen is used in a molar amount of 0.9 to 5 times with respect to TFE, and more preferably oxygen is used in an equimolar amount of TFE. Basically, it is not necessary to add a diluent comprising a fluorine compound to the purified TFE gas or an unpurified TFE gas composition. However, in a particular case where a further safety is required, for example, the coexistence or mixing of a diluent is permitted. Since there is a fear that the quantities of impurities contained in a product are further increased, a product generated as a result of the reaction of the TFE gas with the oxygen gas should not be refluxed to use a diluent. When a diluent is mixed into the purified TFE gas or an unpurified TFE gas composition, the amount of such a diluent is determined, such that the total number of moles of components other than TFE contained in the purified TFE gas or an unpurified TFE gas composition and a diluent may be less than 10 times the number of moles of TFE. In principle, the mixing of a diluent is unnecessary in the present invention.

Next, a method for producing $COF_2$ will be described.

Conventionally, it is said that the reaction of TFE with only oxygen causes explosion. The present inventors have found that $COF_2$ can be efficiently and safely synthesized at a high yield by allowing oxygen, and preferably oxygen in an equimolar amount, to react with the purified TFE gas, or a commercially available unpurified TFE product, or further, a TFE gas composition obtained by thermal decomposition of HCFC-22 without separation and purification, preferably in the absence of nitrogen.

As TFE used in the present invention, TFE gas containing TFE as a main component, which is commercially available or is produced at an industrial level, an unpurified TFE gas composition produced from HCFC-22, or TFE gas obtained by purifying such an unpurified TFE gas composition may be used. As necessary, a diluent may also be added thereto.

Production of TFE from HCFC-22 may be carried out by applying a high-temperature thermal decomposition method to chlorodifluoromethane HCFC-22 according to a commonly used method. Such a method for producing TFE from HCFC-22 may be an internal thermal decomposition method of heating HCFC-22 by allowing it to come into contact with heated water vapor, or an external thermal decomposition method comprising supplying HCFC-22 into a thermal decomposition reactor and then supplying heat from the outside of the reactor by a method such as use of a heat medium or direct heating. In both thermal decomposition methods, HCFC-22 has previously been heated up to a temperature between 200° C. and 400° C. before it is supplied into the thermal decomposition reactor. Thereby, thermal decomposition can be carried out in a short time.

The obtained TFE gas composition is purified or is not purified, and it can be then used as a raw material in the production of $COF_2$ of the present invention. Usually, since the thermal decomposition reaction of HCFC-22 is a complicated reaction attended with decomposition of molecules and the recombination thereof, large quantities of by-products are generated as a result of the reaction. Thus, several operations are carried out to separate and purify such reaction by-products or to recover unreacted HCFC-22 for the reuse thereof. In the present invention, however, since a TFE gas composition can be directly used as a raw material in production of $COF_2$, such purification or recovery is not necessarily required.

Water vapor used in production of TFE is preferably heated up to a temperature between 750° C. and 950° C., which is higher than the reaction temperature. The supply ratio between HCFC-22 and water vapor is not particularly limited, as long as it may be sufficient for carrying out thermal decomposition of HCFC-22. In general, water vapor is used in an amount of 5 to 15 times the amount of HCFC-22. That is to say, the aforementioned supply ratio is preferably in a range of HCFC-22/water vapor (molar ratio)=1/5 to 1/15. In addition, for a sufficient thermal decomposition reaction, the retention time of HCFC-22 in a thermal decomposition reactor is preferably 0.001 to 0.1 second.

The thermal decomposition temperature is not particularly limited, as long as it is a temperature at which HCFC-22 can be decomposed. In order to enhance the yield of TFE, the reaction is carried out in an atmosphere wherein the temperature is between 600° C. and 950° C. As described above, basically, TFE may be produced according to the conventional methods.

$COF_2$ is produced from TFE by a production method comprising: introducing TFE gas selected from a TFE gas mixture of purified TFE gas, an unpurified TFE gas composition comprising a reaction by-product generated during production of TFE, and a diluent comprising a fluorine compound contained as a third component, wherein the content of TFE in the above described TFE gas is greater than the contents of other components at a molar ratio of more than 1/10, into a reactor, together with oxygen gas in a molar amount of 0.9 to 5 times the molar amount of the TFE; and then heating the obtained mixture up to a temperature between 300° C. and 450° C.

The type of the TFE gas is not particularly limited. It is preferably an unpurified TFE gas composition comprising reaction by-products generated during production of TFE.

The reaction method may be a batch-type method using a hermetically sealed reactor, but a flow method (continuous method) of consistently synthesizing $COF_2$ from HCFC-22 is preferable. $COF_2$ can be synthesized at a high yield by carrying out the reaction in a reaction system capable of efficiently diffusing heat generated as a result of the reaction of TFE with oxygen (for example, a reaction system capable of efficiently releasing the heat using a sufficiently long and thin reaction tube), but the method is not particularly limited to such a reaction system. Moreover, although it depends on the applied method that is a batch type or a continuous type, a reaction scale, etc., the size of a reactor in such a batch-type method, the flow rate in a flow-type method, the thickness and length of a reaction tube, a reaction temperature, a contacting time, etc. are finely determined, so that $COF_2$ can be efficiently, safely and inexpensively produced. As specific examples of a preferred reaction system for production of $COF_2$, in a case of using a hermetically sealed reactor for the reaction, for example, there is used a reaction system, wherein the reaction is carried out using a reactor having a volume between 30 L and 40 L with respect to 1 mole of oxygen gas. On the other hand, in a case of using a reaction tube, for example, there is used a reaction system, to which TFE and oxygen are supplied such that the retention time of TFE in the reaction tube can be 1 to 30 seconds.

In the case of the batch method, a method of allowing TFE to react with oxygen at a low pressure using a reactor that is large enough to a raw material is recommended. For example, if approximately 2 mmol TFE and approximately 2 mmol oxygen are used, there can be applied a method comprising adding only the TFE and oxygen to a reactor with a volume of approximately 75 ml, and then heating them up to approximately 400° C. The details are as described above.

In the case of the flow method, a method of supplying TFE gas and oxygen gas in an amount almost equimolar to the TFE gas into a reaction tube, and while causing them to flow into such a sufficiently long, thin tube, allowing the TFE gas to react with the oxygen gas by heating the thin tube, is recommended. In the case of this system, a preferred diameter or length of the reaction tube, a heating temperature, etc. are different depending on the flow rate of gas. For example, if the flow rate of TFE and the flow rate of oxygen are both 60 ml per minute, reaction conditions wherein a reaction tube having a diameter (inside diameter) of approximately 3 mm and a length of approximately 10 m is used, a heating temperature is set at approximately 350° C., and the retention time in the reaction tube is set at approximately 11 seconds, etc. are applied. In addition, reaction conditions, depending upon the flowrates of TFE and oxygen, wherein a reaction tube having a diameter of approximately 6 mm and a length of approximately 2 m is used, a heating temperature is set at approximately 400° C., and the retention time in the reaction tube is set at approximately 3 to 6 seconds, or otherwise, reaction conditions wherein a reaction tube having a diameter of approximately 14 mm and a length of approximately 0.3 m is used, a heating temperature is set at approximately 400° C., and the retention time in the reaction tube is set at approximately 6 seconds, may also be applied.

When the reaction is carried out, a reactor can be filled with a filler such as a catalyst or a heat medium. Examples of such a filler include a metal fluoride, a metal oxide, and a metal. Examples of such a metal fluoride include: typical metal fluorides such as sodium fluoride, potassium fluoride, magnesium fluoride, calcium fluoride, barium fluoride, or aluminum fluoride; and transition element metal fluorides such as ferric fluoride, cobalt fluoride, nickel fluoride, manganese fluoride, copper fluoride, or zinc fluoride. Examples of such a metal oxide include: typical metal oxides such as magnesium oxide or aluminum oxide; and transition element metal oxides such as iron oxide, cobalt oxide, nickel oxide, manganese oxide, copper oxide, or zinc oxide. Any type of metal is used, as long as it does not affect the reaction. Examples of such a metal include Inconel and Hastelloy. Moreover, a combination of a metal with a metal salt, or a combination of different types of metal salts, may be applied. An example of such a combination is an oxide produced by oxidizing the surface of iron.

An ordinary purification method is applied to a crude product obtained in the present reaction, so as to obtain a high-purity $COF_2$. For example, such a crude product is distilled and purified using a distillation column, so as to obtain $COF_2$ having a purity of 99% or more. HCFC-22 separated by such distillation can be reused as a raw material for TFE.

The present reaction can be carried out using high-purity TFE gas or a TFE gas composition and oxygen. In addition, as desired, a diluent may be allowed to coexist in such an amount that the total number of moles of components other than TFE contained in the TFE gas or TFE gas composition and a diluent becomes less than 10 times the number of moles of TFE. Naturally, this is also included in the invention of the present application.

Thus, according to the present invention, differing from the prior art techniques, it is not necessary to use a large amount of diluent comprising an expensive fluorine compound, and further, it is not necessary, either, to use purified expensive TFE gas. An unpurified TFE composition that is industrially synthesized by thermal decomposition of HCFC-22 can be directly used.

Next, the present invention will be more specifically described in the following examples. However, these examples are not intended to limit the scope of the present invention.

Example 1

Production of $COF_2$ from TFE (Batch Method)

Using a vacuum line, TFE (2.2 mmol) and oxygen (2.2 mmol) were introduced into a stainless steel reactor (75 ml) at −196° C. Thus, air was completely eliminated from the reactor, and at the same time, the reactor was filled with the TFE and the oxygen. Thereafter, the reactor was heated up to 400° C. for reaction for 30 minutes. The product was transferred to a −196° C. trap by vacuum line scanning, and the amount thereof was then measured. As a result, the amount was found to be 4.3 mmol.

The product was analyzed by FT-IR, and it was compared with a standard sample. As a result, it was found that the product was mainly composed of $COF_2$, and that the yield was approximately 98%.

Example 2

Continuous Production of $COF_2$ from HCFC-22 (1)
Process 1; Production of TFE Used as Raw Material in Production of $COF_2$ from HCFC-22 (Flow Method)

HCFC-22 (170 ml per minute) and water vapor heated up to 900° C. (1700 ml per minute) were supplied to an Inconel reaction tube having a diameter of 3 mm (inside diameter: approximately 2 mm) and a length of 300 mm, and they were then heated, so as to carry out a reaction at a temperature of 900° C. Thereafter, the generated product was washed with water, and it was then passed through a calcium chloride tube and a soda lime tube, so that it could be dried.

For analysis, an aliquot of the obtained composition was subjected to gas chromatography. As a result, the inversion rate of HCFC-22 was found to be 70%, and the selection rate of TFE was found to be 99% or more.

Process 2; Production of $COF_2$ from TFE (Flow Method)

The TFE composition (gas flow rate: 110 ml per minute) obtained in Process 1 was directly preheated up to 200° C. without purifying it, and it was then supplied at a rate of 60 ml/minute to and was mixed with oxygen that had been preheated up to 200° C. While the thus mixed gas was supplied to an Inconel reaction tube having a diameter of 3 mm (inside diameter: approximately 2 mm) and a length of 10 m, the reaction was carried out at a temperature of 350° C. The retention time was approximately 11 seconds.

The obtained product was analyzed by gas chromatography. As a result, it was found that $COF_2$ was obtained from TFE at a yield of 98%.

Example 3

Continuous Production of $COF_2$ from HCFC-22 (2)

HCFC-22 (253 ml per minute) and water vapor heated up to 920° C. (1700 ml per minute) were supplied to an Inconel reaction tube having a diameter of 3 mm (inside diameter: approximately 2 mm) and a length of 300 mm, and they were then heated, so as to carry out a reaction at a temperature of 920° C. Thereafter, the generated product was washed with water, and it was then passed through a calcium chloride tube and a soda lime tube. Thereafter, the product was preheated up to 200° C., and it was then supplied at a rate of 285 ml/minute to and was mixed with oxygen that had been preheated up to 200° C. While the thus mixed gas was supplied to an Inconel reaction tube having a diameter of 6.4 mm (inside diameter: approximately 4 mm) and a length of 2 m, the reaction was carried out at a temperature of 400° C. The retention time was approximately 3 seconds.

The obtained product was analyzed by gas chromatography. As a result, it was found that $COF_2$ was obtained from TFE at a yield of 90%.

Example 4

Continuous Production of $COF_2$ from HCFC-22 (3)

HCFC-22 (253 ml per minute) and water vapor heated up to 920° C. (1600 ml per minute) were supplied to an Inconel reaction tube having a diameter of 3 mm (inside diameter: approximately 2 mm) and a length of 300 mm, and they were then heated, so as to carry out a reaction at a temperature of 920° C. Thereafter, the generated product was washed with water, and it was then passed through a calcium chloride tube and a soda lime tube. Thereafter, the product was preheated up to 200° C., and it was then supplied at a rate of 109 ml/minute to and was mixed with oxygen that had been preheated up to 200° C. While the thus mixed gas was supplied to a Monel reaction tube having a diameter of 6.4 mm (inside diameter: approximately 4 mm) and a length of 2 m, the reaction was carried out at a temperature of 400° C. The retention time was approximately 6 seconds.

The obtained product was analyzed by gas chromatography. As a result, it was found that $COF_2$ was obtained from TFE at a yield of 97%.

Example 5

Continuous Production of $COF_2$ from HCFC-22 (4)

HCFC-22 (253 ml per minute) and water vapor heated up to 920° C. (1600 ml per minute) were supplied to an Inconel reaction tube having a diameter of 3 mm (inside diameter: approximately 2 mm) and a length of 300 mm, and they were then heated, so as to carry out a reaction at a temperature of 920° C. Thereafter, the generated product was washed with water, and it was then passed through a calcium chloride tube and a soda lime tube. Thereafter, the product was preheated up to 200° C., and it was then supplied at a rate of 109 ml/minute to and was mixed with oxygen that had been preheated up to 200° C. While the thus mixed gas was supplied to an Inconel reaction tube having a diameter of 14 mm (inside diameter: approximately 11 mm) and a length of 30 cm, the reaction was carried out at a temperature of 370° C. The retention time was approximately 6 seconds.

The obtained product was analyzed by gas chromatography. As a result, it was found that $COF_2$ was obtained from TFE at a yield of 100%.

Example 6

Continuous Production of $COF_2$ from HCFC-22 (5)

HCFC-22 (253 ml per minute) and water vapor heated up to 920° C. (1600 ml per minute) were supplied to an Inconel reaction tube having a diameter of 3 mm (inside diameter: approximately 2 mm) and a length of 300 mm, and they were then heated, so as to carry out a reaction at a temperature of 920° C. Thereafter, the generated product was washed with water, and it was then passed through a calcium chloride tube and a soda lime tube. Thereafter, the product was preheated up to 200° C., and it was then supplied at a rate of 109 ml/minute to and was mixed with oxygen that had been preheated up to 200° C. While the thus mixed gas was supplied to an Inconel reaction tube having a diameter of 14 mm (inside diameter: approximately 11 mm) and a length of 30 cm, the reaction was carried out at a temperature of 400° C. The retention time was approximately 6 seconds.

The obtained product was analyzed by gas chromatography. As a result, it was found that $COF_2$ was obtained from TFE at a yield of 88%.

Example 7

Continuous Production of $COF_2$ from HCFC-22 (6)

The reaction was carried out in the same manner as that in Example 6 with the exception that 15 ml of meshed iron whose surface was formed with iron oxide had been placed in the reaction tube.

The obtained product was analyzed by gas chromatography. As a result, it was found that $COF_2$ was obtained from TFE at a yield of 94%.

Comparative Example 1; Reaction of TFE with Oxygen in Presence of Nitrogen Gas (1)

The TFE composition obtained in the aforementioned Process 1 of Example 2 was preheated up to 200° C. The thus preheated composition was mixed with air that had been preheated up to 200° C. (oxygen amount: 60 to 100 ml per minute). The thus mixed gas was supplied to an Inconel reaction tube having a diameter of 3 mm (inside diameter: approximately 2 mm) and a length of 10 m at a temperature of 350° C.

The gas obtained from the reaction tube was analyzed by gas chromatography. As a result, it was found that the reaction of TFE with air did not progress.

Comparative Example 2; Reaction of TFE with Oxygen in Presence of Nitrogen Gas (2)

The reaction was carried out in the same manner as that in Example 4 with the exception that air was used (oxygen amount: 109 ml per minute) instead of oxygen.

The obtained product was analyzed by gas chromatography. As a result, it was found that $COF_2$ was generated, but that the yield thereof was extremely low (13%).

The results of these comparative examples demonstrated that the reaction of the TFE composition with oxygen did not progress or hardly progressed in the presence of nitrogen.

INDUSTRIAL APPLICABILITY

According to the production method of the present invention, $COF_2$ can be easily and safely produced by subjecting TFE or a TEF product and oxygen gas in an equimolar amount of the TFE or TFE product to a heat reaction in the absence of nitrogen gas, preferably using a tubular reaction tube. That is to say, according to the present invention, $COF_2$ that is useful as cleaning gas for CVD devices (chemical vapor deposition method) can be inexpensively, efficiently, and safely produced.

The invention claimed is:

1. A method for producing carbonyl fluoride, comprising: introducing a tetrafluoroethylene gas component comprising a mixture of a purified tetrafluoroethylene gas, wherein the purified tetrafluoroethylene gas has a purity concentration of 90% or more, and a diluent selected from chlorofluorocarbons (CFCs), hydrochlorofluorocarbons (HCFCs), perfluorocarbons (PFCs), or hydrofluorocarbons (HFCs), or an unpurified tetrafluoroethylene gas composition comprising a reaction by-product generated during production of the unpurified tetrafluoroethylene gas, wherein the content of tetrafluoroethylene in said tetrafluoroethylene gas component is greater than the contents of other components of the tetrafluoroethylene gas component at a molar ratio of more than 1/10, into a reactor, in the absence of oxygen difluoride, together with oxygen gas in a molar amount of 0.9 to 5 times the molar amount of tetrafluoroethylene in said tetrafluoroethylene as component; and then heating the obtained mixture for reaction.

2. The method for producing carbonyl fluoride according to claim 1, wherein the oxygen gas is in a molar amount of 0.9 to 3.5 times the molar amount of tetrafluoroethylene in said tetrafluoroethylene gas component.

3. The method for producing carbonyl fluoride according to claim 1, wherein nitrogen gas is contained in the reactor in a molar amount of 3 times or less the molar amount of the oxygen gas.

4. The method for producing carbonyl fluoride according to claim 1, wherein the reactor is filled with a filler used as a catalyst or a heating medium selected from the group consisting of a metal fluoride, a metal oxide, and a metal.

5. The method for producing carbonyl fluoride according to claim 1, wherein the reactor is a corrosive-resistant hermetically sealed reactor, and the reactor has a volume of 30 L to 40 L per 1 mole of oxygen gas.

6. The method for producing carbonyl fluoride according to claim 1, wherein the reactor is a reaction tube for oxidation reaction.

7. The method for producing carbonyl fluoride according to claim 6, wherein the reaction tube for oxidation reaction is a corrosive-resistant reaction tube having a diameter between 0.3 mm and 30 mm and a length between 0.1 m and 30 m.

8. The method for producing carbonyl fluoride according to claim 6, wherein the retention time of the tetrafluoroethylene gas component in the reaction tube is 1 to 30 seconds.

9. The method for producing carbonyl fluoride according to claim 1, wherein gas temperature of the reaction is between 300° C. and 450° C.

10. A method for producing carbonyl fluoride, comprising: introducing a purified highly-concentrated tetrafluoroethylene gas, wherein the purified highly-concentrated tetrafluoroethylene gas has a purity concentration of 98% or more, or a tetrafluoroethylene gas mixture of said purified highly-concentrated tetrafluoroethylene gas and a diluent, selected from chlorofluorocarbons (CFCs), hydrochlorofluorocarbons (HCFCs), perfluorocarbons (PFCs), or hydrofluorocarbons (HFCs), wherein the content of tetrafluoroethylene in said tetrafluoroethylene gas mixture is greater than the contents of other components of the tetrafluoroethylene gas mixture at a molar ratio of more than 1/10, into a reactor, in the absence of oxygen difluoride, together with oxygen gas in a molar amount of 0.9 to 5 times the molar amount of tetrafluoroethylene in said purified highly-concentrated tetrafluoroethylene gas or said tetrafluoroethylene gas mixture; and then heating the obtained mixture for reaction.

11. A method for producing carbonyl fluoride, comprising: introducing an unpurified tetrafluoroethylene gas composition obtained by the thermal decomposition reaction of HCFC-22, or a tetrafluoroethylene gas mixture of said unpurified tetrafluoroethylene gas composition and a diluent selected from chlorofluorocarbons (CFCs), hydrochlorofluorocarbons (HCFCs), perfluorocarbons (PFCs), or hydrofluorocarbons (HFCs), wherein the content of tetrafluoroethylene in said unpurified tetrafluoroethylene gas composition or said tetrafluoroethylene gas mixture is greater than the contents of other components of said unpurified tetrafluoroethylene gas composition or said tetrafluoroethylene gas mixture at a molar ratio of more than 1/10, into a reactor, in the absence of oxygen difluoride, together with oxygen gas in a molar amount of 0.9 to 5 times the molar amount of tetrafluoroethylene in said unpurified tetrafluoroethylene gas composition or said tetrafluoroethylene gas mixture said tetrafluoroethylene; and then heating the obtained mixture for reaction.

* * * * *

UNITED STATES PATENT AND TRADEMARK OFFICE
CERTIFICATE OF CORRECTION

PATENT NO.       : 8,513,458 B2                                                                         Page 1 of 1
APPLICATION NO. : 12/067243
DATED            : August 20, 2013
INVENTOR(S)      : Quan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1547 days.

Signed and Sealed this
Fifteenth Day of September, 2015

Michelle K. Lee
*Director of the United States Patent and Trademark Office*